United States Patent
Pinheiro et al.

(10) Patent No.: US 10,111,240 B2
(45) Date of Patent: Oct. 23, 2018

(54) APPARATUS AND METHOD ENHANCING QUALITY OF SERVICE ARCHITECTURE FOR LTE

(71) Applicant: Intel IP Corporation, Santa Clara, CA (US)

(72) Inventors: Ana Lucia Pinheiro, Portland, OR (US); Marta Martinez Tarradell, Hillsboro, OR (US); Richard C. Burbidge, Shrivenham (GB)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/300,817

(22) PCT Filed: Jun. 26, 2015

(86) PCT No.: PCT/US2015/038010
§ 371 (c)(1),
(2) Date: Sep. 30, 2016

(87) PCT Pub. No.: WO2016/003805
PCT Pub. Date: Jan. 7, 2016

(65) Prior Publication Data
US 2017/0105227 A1 Apr. 13, 2017

Related U.S. Application Data

(60) Provisional application No. 62/019,308, filed on Jun. 30, 2014.

(51) Int. Cl.
*H04W 72/08* (2009.01)
*H04W 28/02* (2009.01)
(Continued)

(52) U.S. Cl.
CPC ..... *H04W 72/087* (2013.01); *H04W 28/0263* (2013.01); *H04W 28/0268* (2013.01); *H04L 43/026* (2013.01); *H04W 88/02* (2013.01)

(58) Field of Classification Search
CPC ....... H04L 69/16; H04L 69/167; H04L 29/06; H04L 47/10; H04L 47/20; H04L 47/2441;
(Continued)

(56) References Cited

U.S. PATENT DOCUMENTS

2003/0039259 A1* 2/2003 Madour .................. H04L 29/06
370/401
2004/0205247 A1* 10/2004 Ahn .................. H04L 29/12009
709/245
(Continued)

FOREIGN PATENT DOCUMENTS

CN 106537857 3/2017
JP 2012503447 A 2/2012
(Continued)

OTHER PUBLICATIONS

"Comparison of solutions: IP flow routing capability", Blackberry UK Limited, R2-132771, 3GPP TSG-RAN WG2 Meeting #83, (Aug. 10, 2013), 1-2.
(Continued)

*Primary Examiner* — Jung Liu
(74) *Attorney, Agent, or Firm* — Schwegman Lundberg & Woessner, P.A.

(57) ABSTRACT

Embodiments of a User Equipment (UE) arranged for transmitting packets in a cellular network are disclosed herein. The UE can generate a first packet having a first packet classification information and a second packet having a second packet classification information. The first packet classification information can be associated with a different quality of service (QoS) requirement than the second packet
(Continued)

classification information. The UE, using a packet filter, can determine, based on the first packet classification information, a first traffic flow from a plurality of traffic flows in a traffic flow template (TFT) for transmitting the first packet. Additionally, the UE can determine, based on the second packet classification information, a second traffic flow from the plurality of traffic flows for transmitting the second packet. Subsequently, the UE send the first packet to the first traffic flow and the second packet to the second traffic flow.

19 Claims, 14 Drawing Sheets

(51) Int. Cl.
*H04W 88/02* (2009.01)
*H04L 12/26* (2006.01)

(58) Field of Classification Search
CPC . H04L 47/2433; H04L 47/14; H04L 47/2416; H04L 2212/00; H04W 80/04; H04W 8/26; H04W 80/00; H04W 28/16
See application file for complete search history.

(56) References Cited

U.S. PATENT DOCUMENTS

| | | | |
|---|---|---|---|
| 2006/0045128 A1* | 3/2006 | Madour | H04L 47/10 370/466 |
| 2007/0266430 A1* | 11/2007 | Babbar | H04W 28/06 726/13 |
| 2008/0002579 A1 | 1/2008 | Lindholm et al. | |
| 2010/0034083 A1 | 2/2010 | Prakash et al. | |
| 2010/0260048 A1 | 10/2010 | Dolganow et al. | |
| 2012/0092992 A1 | 4/2012 | Pappas et al. | |
| 2012/0182859 A1* | 7/2012 | Ikeda | H04L 1/1835 370/216 |
| 2012/0281566 A1* | 11/2012 | Pelletier | H04W 76/046 370/252 |
| 2013/0301611 A1* | 11/2013 | Baghel | H04W 74/0833 370/331 |
| 2014/0105017 A1 | 4/2014 | Pappas et al. | |
| 2015/0245240 A1* | 8/2015 | Lovsen | H04L 41/5022 370/259 |
| 2014/0036679 A1 | 9/2015 | Cherian et al. | |
| 2016/0112896 A1* | 4/2016 | Karampatsis | H04W 28/0252 370/230.1 |
| 2016/0183156 A1* | 6/2016 | Chin | H04W 36/0022 370/331 |

FOREIGN PATENT DOCUMENTS

| | | |
|---|---|---|
| JP | 2013512600 A | 4/2013 |
| JP | 2013197653 A | 9/2013 |
| JP | 2014508459 A | 4/2014 |
| JP | 2017525178 | 8/2017 |
| WO | WO-2008102442 A1 | 8/2008 |
| WO | WO-2013034195 A1 | 3/2013 |
| WO | WO-2013112084 A1 | 8/2013 |
| WO | WO-2016003805 A1 | 1/2016 |

OTHER PUBLICATIONS

"International Application Serial No. PCT/US2015/038010, International Search Report dated Sep. 18, 2015", 3.
"International Application Serial No. PCT/US2015/038010, Written Opinion dated Sep. 18, 2015", 9 pgs.
"", 3GPP TS 23.401 V11.0.0, (Dec. 2011), 285 pgs.
"EPS bearer model for PMIP based S5/S8 and E-UTRAN access", Samsung, Nortel, Alcatel-Lucent, Verizon Wireless, 3GPP. TSG-SA WG 2#60 S2-074660, [Online] Retrieved from the Internet: <http://www.3gpp.org/ftp/tsg_sa/WG2_Arch/TSGS2_60_Kobe/Docs/S2-074660.zip>, (Oct. 2007), 5 pgs.
"European Application Serial No. 15814631.6, Extended European Search Report dated Jan. 25, 2018", 7 pgs.
"Japanese Application Serial No. 2016-568802, Office Action dated Jan. 23, 2018", w/English Translation, 7 pgs.
"Japanese Application Serial No. 2016-568802, Response filed Apr. 23, 2018 to Office Action dated Jan. 23, 2018", W/ English Claims, 25 pgs.
"European Application Serial No. 15814631.6, Response filed Aug. 2, 2018 to Extended European Search Report dated Jan. 25, 2018", 21 pgs.

* cited by examiner

APPARATUS AND METHOD ENHANCING QUALITY OF SERVICE ARCHITECTURE FOR LTE

PRIORITY CLAIM

This application is a U.S. National Stage Application under 35 U.S.C. 371 from International Application No. PCT/US2015/038010, filed Jun. 26, 2015, which claims the benefit of priority to U.S. Provisional Patent Application No. 62/019,308, filed Jun. 30, 2014, each of which are incorporated herein by reference in their entirety.

TECHNICAL FIELD

Embodiments pertain to wireless communications. Some embodiments relate to cellular communication networks, including networks configured to operation in accordance with the third-generation partnership project (3GPP) long term evolution (LTE) and LTE-advanced (LTE-A) standards. Some embodiments relate to enhancing the quality of service (QoS) handling.

BACKGROUND

In some instances, multiple applications can be concurrently running in a User Equipment (UE), each application having different QoS requirements. For example, a UE can be engaged in a voice call while at the same time browsing a webpage or downloading a file. The voice call can have more stringent requirements for QoS in terms of delay and delay jitter than the web browsing or file downloading. In order to support multiple QoS requirements, different bearers are set up within the LTE Evolved Packet System (EPS), each being associated with a QoS. The bearers are commonly known as EPS bearers.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
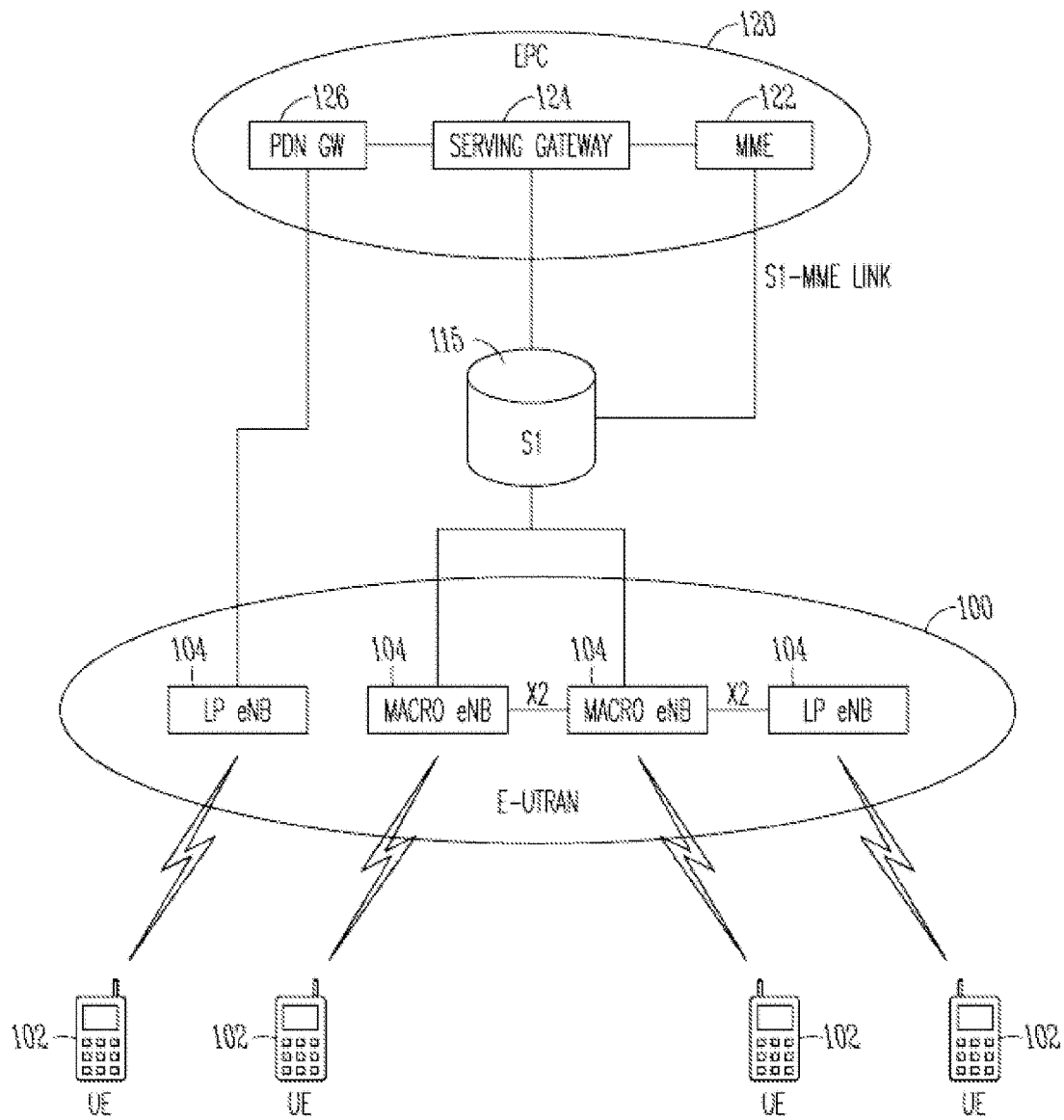
FIG. 1 is a functional diagram of a 3GPP network in accordance with some embodiments.
Figure 2:
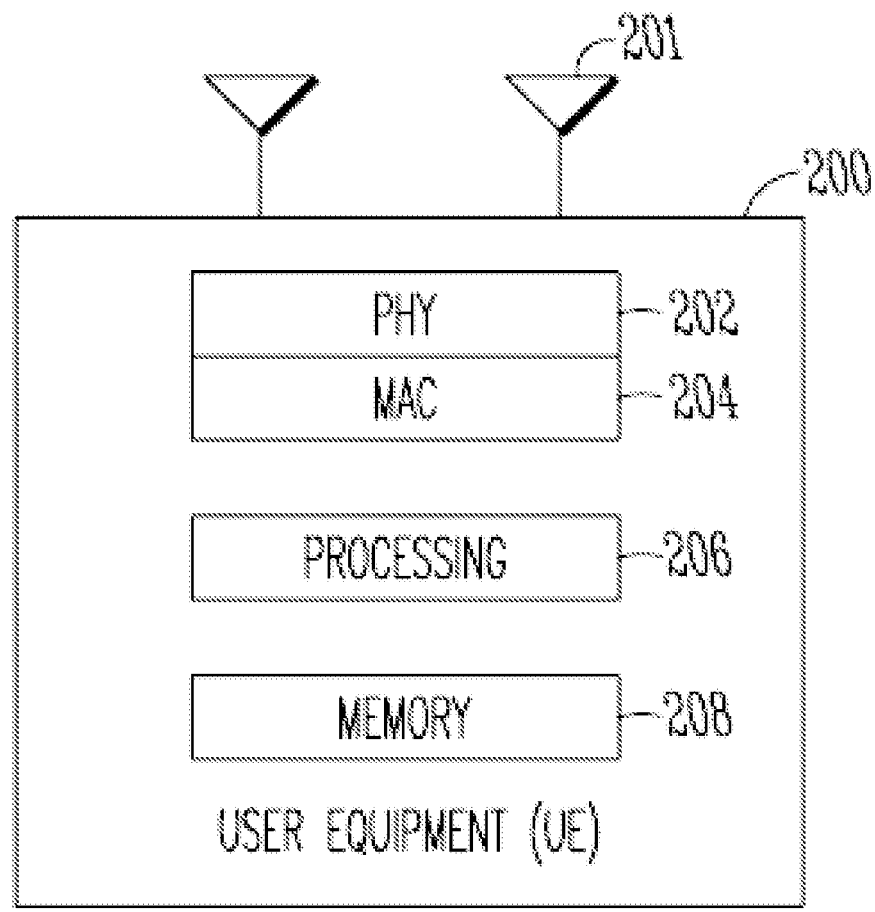
FIG. 2 is a functional diagram of a User Equipment (UE) in accordance with some embodiments.
Figure 3:
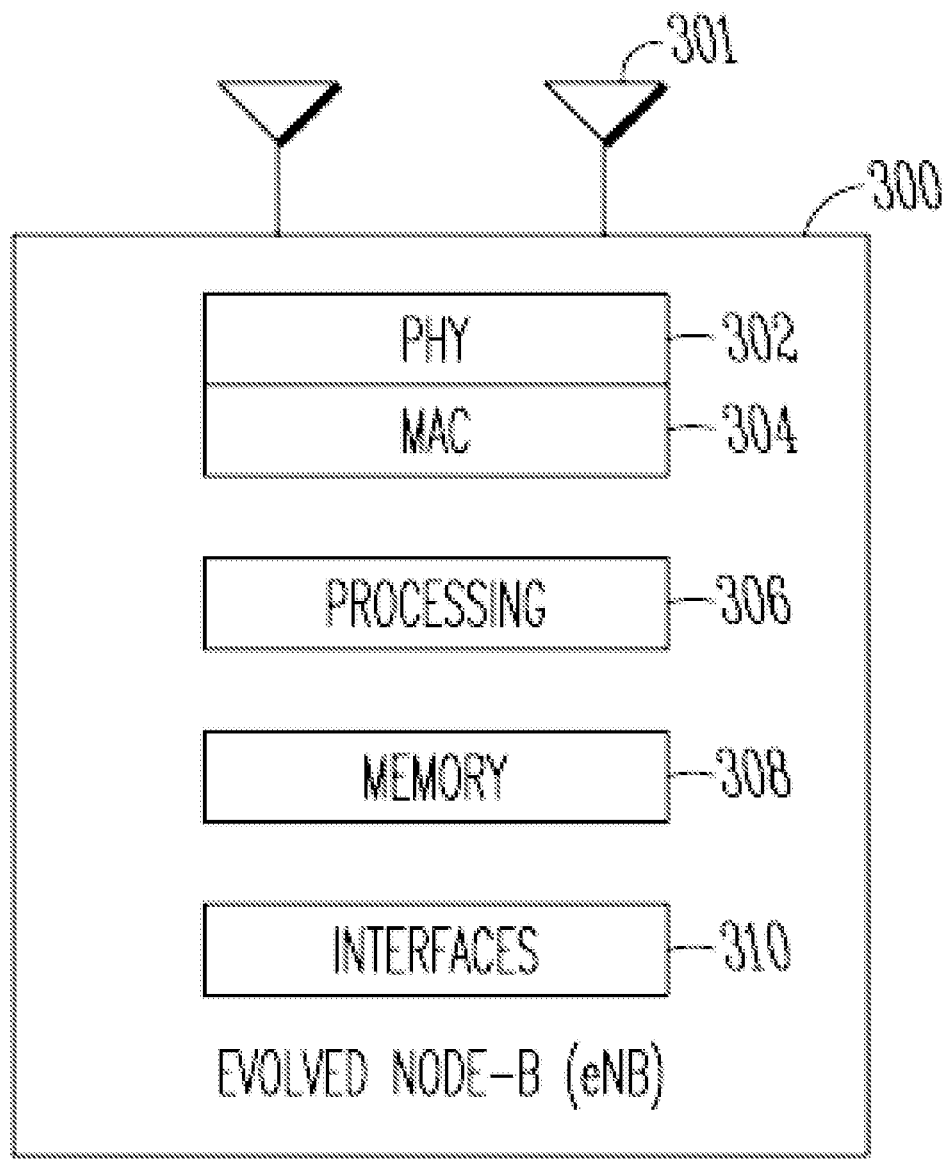
FIG. 3 is a functional diagram of an Evolved Node B (eNB) in accordance with some embodiments.
Figure 4:
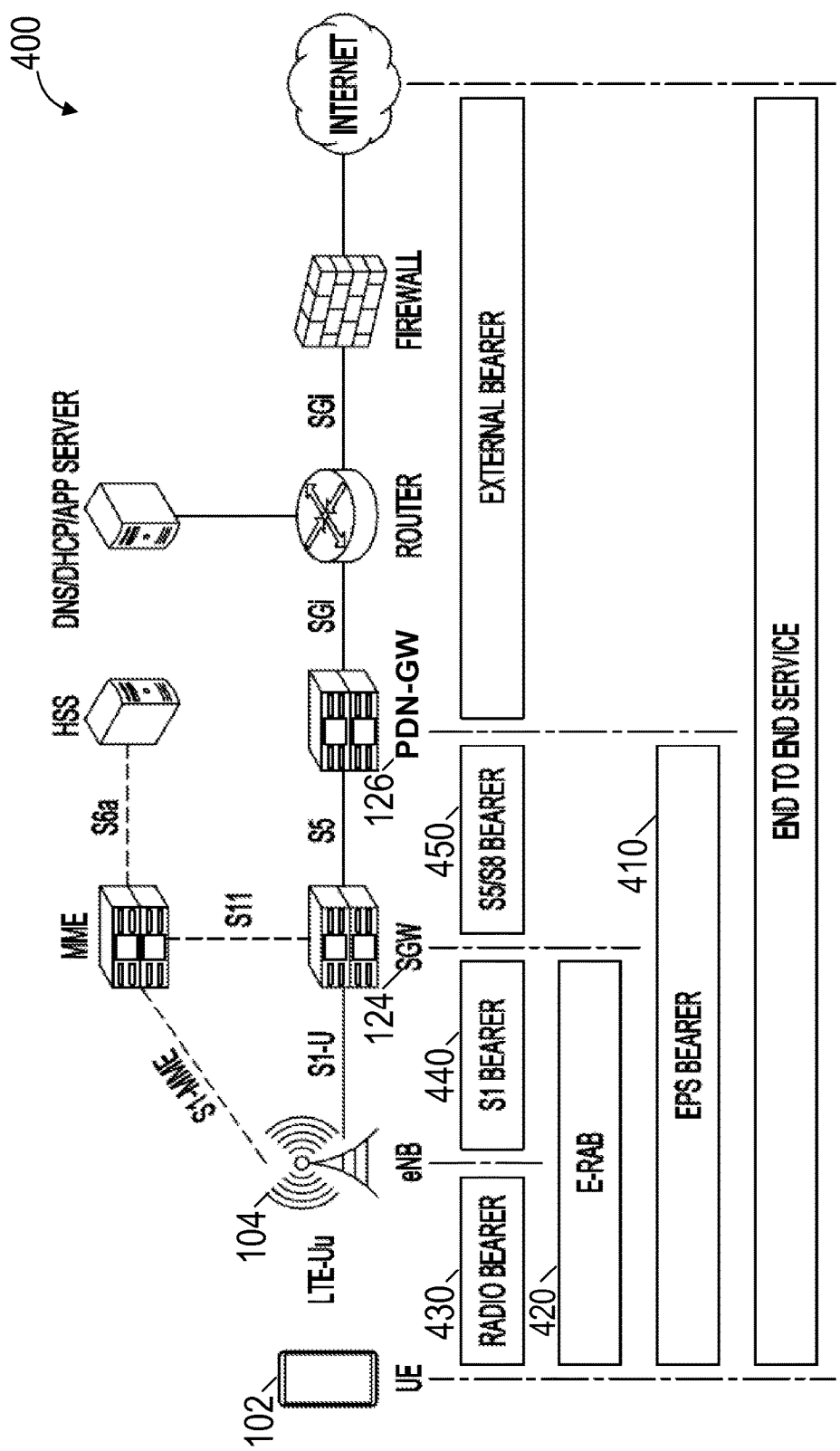
FIG. 4 illustrates an example of a scenario of the EPS bearer service layered architecture in a 3GPP network, in accordance with some embodiment.
Figure 5:
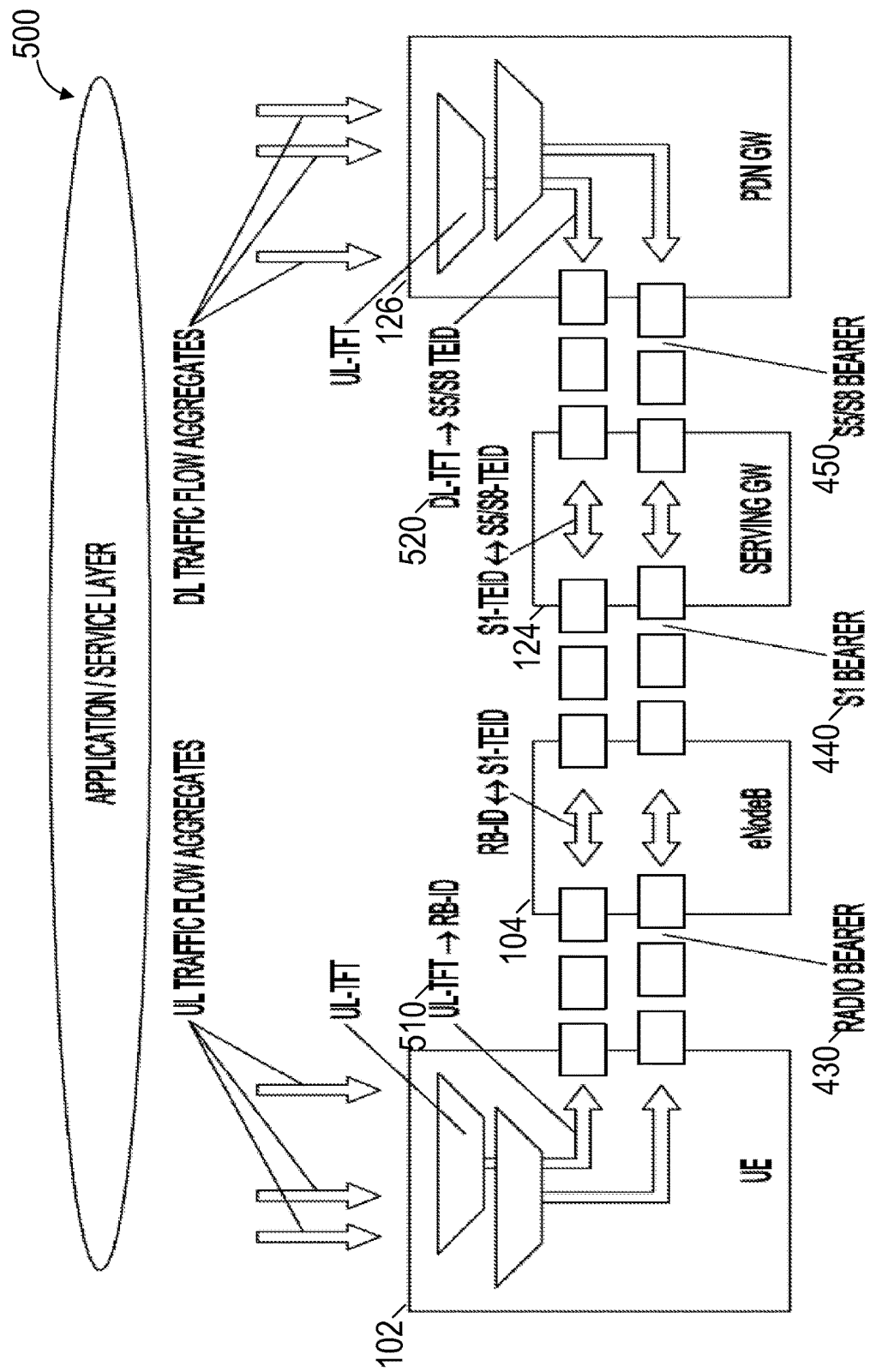
FIG. 5 illustrates an example of a scenario of the usage of an uplink and a downlink traffic flow template (TFT) in an EPS bearer service layered architecture, in accordance with some embodiments.

QoS improvements using existing LTE architecture are discussed here. As an overview, FIGS. 1-3 illustrate functional diagrams of an exemplary 3GPP network, a UE, and an eNB, respectively. Additionally, FIGS. 4-5 provide an exemplary overview of current usage of the traffic flow template (TFT) and packet filters in a LTE network, and its relationship to the EPS bearers and the protocol stack. FIGS. 6-14 describe techniques of using a packet filter to improve QoS handling.

According to some embodiments, QoS can be improved by: (1) enhancing packet filters (e.g., as described in FIG. 6-9); (2) associating QoS parameters to packet filters (e.g., as described in FIGS. 10-11); and (3) extending the usage of packet filters to other nodes (e.g., as described in FIG. 12). Furthermore, each improvement can be applied individually or combined together to enhance the QoS handling.

FIG. 1 is a functional diagram of a 3GPP network in accordance with some embodiments. The network comprises a radio access network (RAN) (e.g., as depicted, the E-UTRAN or evolved universal terrestrial radio access network) 100 and a core network 120 (e.g., shown as an evolved packet core (EPC)) coupled together through an S1 interface 115. For the sake of convenience and brevity, only a portion of the core network 120, as well as the RAN 100, is shown.

The core network 120 includes a mobility management entity (MME) 122, serving gateway (serving GW) 124, and a packet data network gateway (PDN GW) 126. The RAN 100 includes Evolved Node-Bs (eNBs) 104 (which may operate as base stations) for communicating with User Equipments (UEs) 102. The eNBs 104 may include macro eNBs and low power (LP) eNBs, such as micro eNBs.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the core network 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separate physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate orthogonal frequency-division multiplexing (OFDM) communication signals with an eNB 104 over a multicarrier communication channel in accordance with an orthogonal frequency-division multiple access (OFDMA) communication technique. The OFDM signals may comprise a plurality of orthogonal subcarriers.

The S1 interface 115 is the interface that separates the RAN 100 and the core network 120. It is split into two parts: the S1-U, which carries data traffic between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In cellular networks, low power (LP) cells are typically used to extend coverage to indoor areas where outdoor signals do not reach well, or to add network capacity in areas with very dense phone usage, such as train stations. As used herein, the term "LP eNB" refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a typical range of 30 to 50 meters for residential femtocells. Thus, an LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, an LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmissions from the UE 102 to the eNB 104 may utilize similar techniques. The grid may be a time-frequency grid, called a resource grid or time-frequency resource grid, which is the physical resource in the downlink in each slot. Such a time-frequency plane representation is common for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical downlink control channel.

The physical downlink shared channel (PDSCH) carries user data and higher-layer signaling to a UE 102. The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four quadrature phase-shift keying (QPSK) symbols are mapped to each REG. The PDCCH can be transmitted using one or more CCEs, depending on the size of DCI and the channel condition. There may be four or more different PDCCH formats defined in LTE with different numbers of CCEs (e.g., aggregation level L=1, 2, 4, or 8).

FIG. 2 is a functional diagram of a User Equipment (UE) 200 in accordance with some embodiments. FIG. 3 is a functional diagram of an Evolved Node B (eNB) 300 in accordance with some embodiments. It should be noted that in some embodiments, the eNB 300 may be a stationary non-mobile device. The UE 200 may be a UE 102 as depicted in FIG. 1, while the eNB 300 may be an eNB 104 as depicted in FIG. 1. The UE 200 may include physical layer circuitry 202 for transmitting and receiving signals to and from the eNB 300, other eNBs, other UEs, or other devices using one or more antennas 201, while the eNB 300 may include physical layer circuitry 302 for transmitting and receiving signals to and from the UE 200, other eNBs, other UEs, or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein, and the eNB 300 may also include processing circuitry 306 and memory 308 arranged to perform the operations described herein. The eNB 300 may also include one or more interfaces 310, which may enable communication with other components, including other eNBs 104 (FIG. 1), components in the core network 120 (FIG. 1), or other network components. In addition, the interfaces 310 may enable communication with other components that may not be shown in FIG. 1, including components external to the network. The interfaces 310 may be wired, wireless, or a combination thereof.

The antennas 201, 301 may comprise one or more directional or omnidirectional antennas, including, for example, dipole antennas, monopole antennas, patch antennas, loop antennas, microstrip antennas, or other types of antennas suitable for transmission of radio frequency (RF) signals. In some multiple-input multiple-output (MIMO) embodiments, the antennas 201, 301 may be effectively separated to take advantage of spatial diversity and the different channel characteristics that may result.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device including wearable devices that may receive and/or transmit information wirelessly. In some embodiments, the mobile device or other device can be a UE or an eNB configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

Although the UE 200 and the eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors that may be configured with instructions stored on a computer-readable storage device.

In some embodiments, the UE 200 may be configured to receive OFDM communication signals over a multicarrier communication channel in accordance with an OFDMA communication technique. The OFDM signals may comprise a plurality of orthogonal subcarriers. In some broadband multicarrier embodiments, the eNB 300 may be part of a broadband wireless access (BWA) communication network, such as a Worldwide Interoperability for Microwave Access (WiMAX) communication network, a 3rd Generation Partnership Project (3GPP) Universal Terrestrial Radio Access Network (UTRAN) Long-Term-Evolution (LTE) network, or a Long-Term-Evolution (LTE) communication network, although the scope of this disclosure is not limited in this respect. In these broadband multicarrier embodiments, the UE 200 and the eNB 300 may be configured to communicate in accordance with an OFDMA technique.

LTE Architecture for QoS

FIG. 4 illustrates an example of a scenario 400 of the EPS bearer service layered architecture in a 3GPP network, in accordance with some embodiments. As previously discussed, FIG. 1 is a functional diagram of a 3GPP network.

In some instances, an uplink (UL) Traffic Flow Template (TFT) in the UE 102 binds a traffic flow or a Service Data Flow (SDF) to an EPS bearer 410 in the uplink direction. Multiple traffic flows can be multiplexed onto the same EPS bearer 410 by including multiple uplink packet filters in the UL TFT.

A downlink (DL) TFT in the PDN GW 126 can bind a traffic flow to an EPS bearer 410 in the downlink direction. As previously mentioned, multiple traffic flows can be multiplexed onto the same EPS bearer 410 by including multiple downlink packet filters in the DL TFT.

An Enhanced Radio Access Bearer (E-RAB) 420 can transport the packets of an EPS bearer between the UE 102 and the core network 120. When an E-RAB 420 exists, there can be a one-to-one mapping between the E-RAB 420 and an EPS bearer 410.

A data radio bearer 430 can transport the packets of an EPS bearer 410 between a UE 102 and an eNB 104. When a data radio bearer 430 exists, there can be a one-to-one mapping between the data radio bearer 430 and the EPS bearer 410, and there can be a one-to-one mapping between the data radio bearer 430 and the E-RAB 420.

An S1 bearer 440 can transport the packets of an E-RAB 420 between the eNB 104 and the serving gateway (SGW) 124.

An S5/S8 bearer 450 can transport the packets of an EPS bearer 410 between an SGW 124 and a PDN GW 126.

The UE 102 can store a mapping between an uplink packet filter and a data radio bearer 430 to create the binding between a traffic flow and a data radio bearer 430 in the uplink.

The PDN GW 126 can store a mapping between a downlink packet filter and an S5/S8a bearer 450 to create the binding between a traffic flow and an S5/S8a bearer 450 in the downlink.

The eNB 104 can store a one-to-one mapping between a data radio bearer 430 and an S1 bearer 440 to create the binding between a data radio bearer 430 and an S1 bearer 440 in both the uplink and downlink.

The SGW 124 can store a one-to-one mapping between an S1 bearer 440 and an S5/S8a bearer 450 to create the binding between an S1 bearer 440 and an S5/S8a bearer 450 in both the uplink and downlink.

FIG. 5 illustrates an example of a scenario 500 of the usage of an uplink traffic flow template (UL TFT) 510 and a downlink traffic flow template (DL TFT) 520 in an EPS bearer service layered architecture, in accordance with some embodiments. The UL TFT 510 is a TFT for an uplink transmission, and the DL TFT 520 is a TFT for a downlink transmission. As previously discussed, FIG. 4 is an example of an EPS bearer service layered architecture.

In current implementations, if a packet data network (PDN) connection consists of several EPS bearers, each EPS bearer (e.g., EPS bearer 410) (except for the default EPS bearer) can be associated with a TFT. Optionally, the default EPS bearer may be associated with a TFT.

In some instances, when the UE 102 sends an uplink user data packet, the UE 102 can check the packet filters across all UL TFTs (e.g., UL TFT 510) to check for a match. For example, each packet filter can have a packet filter evaluation precedence. Continuing with the example, the UE 102 can check the packet filters starting with the highest evaluation precedence. Once the UE 102 determines the correct UL TFT (e.g., UL TFT 510), the UE 102 can deliver the user data packet to the respective associated EPS bearer (e.g., EPS bearer 410) for an uplink transmission.

A similar process can occur in the PDN GW 126 for a downlink transmission to determine the correct DL TFT (e.g., DL TFT 520).

LTE Packet Filters

According to some embodiments, techniques for enhancing current LTE packet filters to improve QoS handing are described herein. As previously described, the EPS bearer 410 can be associated with a specific QoS. The UL TFT 510 and the DL TFT 520 can be assigned to a dedicated bearer (e.g., EPS bearer 410), or a default bearer. Additionally, the TFT (e.g., UL TFT 510, DL TFT 520) can contain one or more packet filters.

In some instances, the packet filter can inspect the packet and compare the information in the packet with one or more filter contents. Based on comparison, the packet filter can assign the packet to a specific traffic flow.

Figure 6:
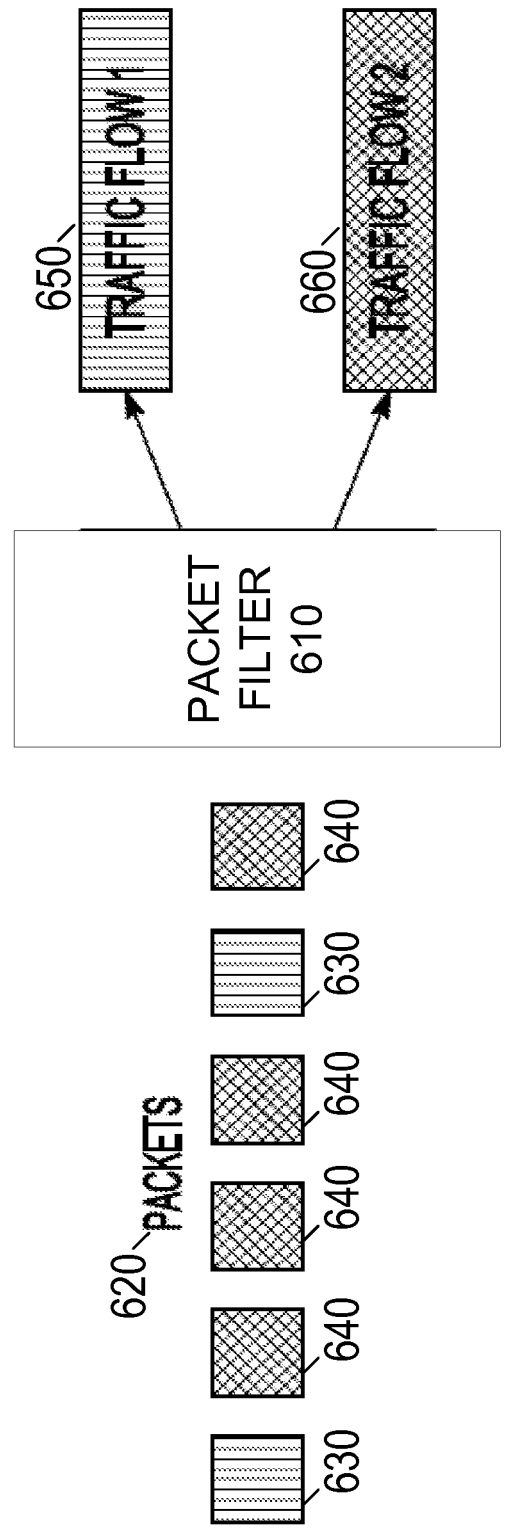
FIG. 6 illustrates a simplified example of a packet filter in a TFT, in accordance with some embodiments.

FIG. 6 illustrates a simplified example of a packet filter in a TFT, in accordance with some embodiments. The TFT can be the UL TFT 510 or the DL TFT 520 as illustrated in FIG. 5.

In some instances, a packet filter 610 can filter the plurality of packets 620 based on a characteristic of the packet. For example, a packet having a first characteristic 630 (e.g., packet classification information) can have a striped pattern, and a packet having a second characteristic 640 (e.g., packet classification information) can have a diagonal crossing pattern.

Based on the characteristics of the packet, the packet filter can determine that the packet having a first characteristic 630 is routed to a first traffic flow 650, and a packet having a second characteristic 640 is routed to a second traffic flow 660. Accordingly, the packet filter 610 can inspect the packet, and compare the packet with the filter content in order to route the packet accordingly.

Figure 7:
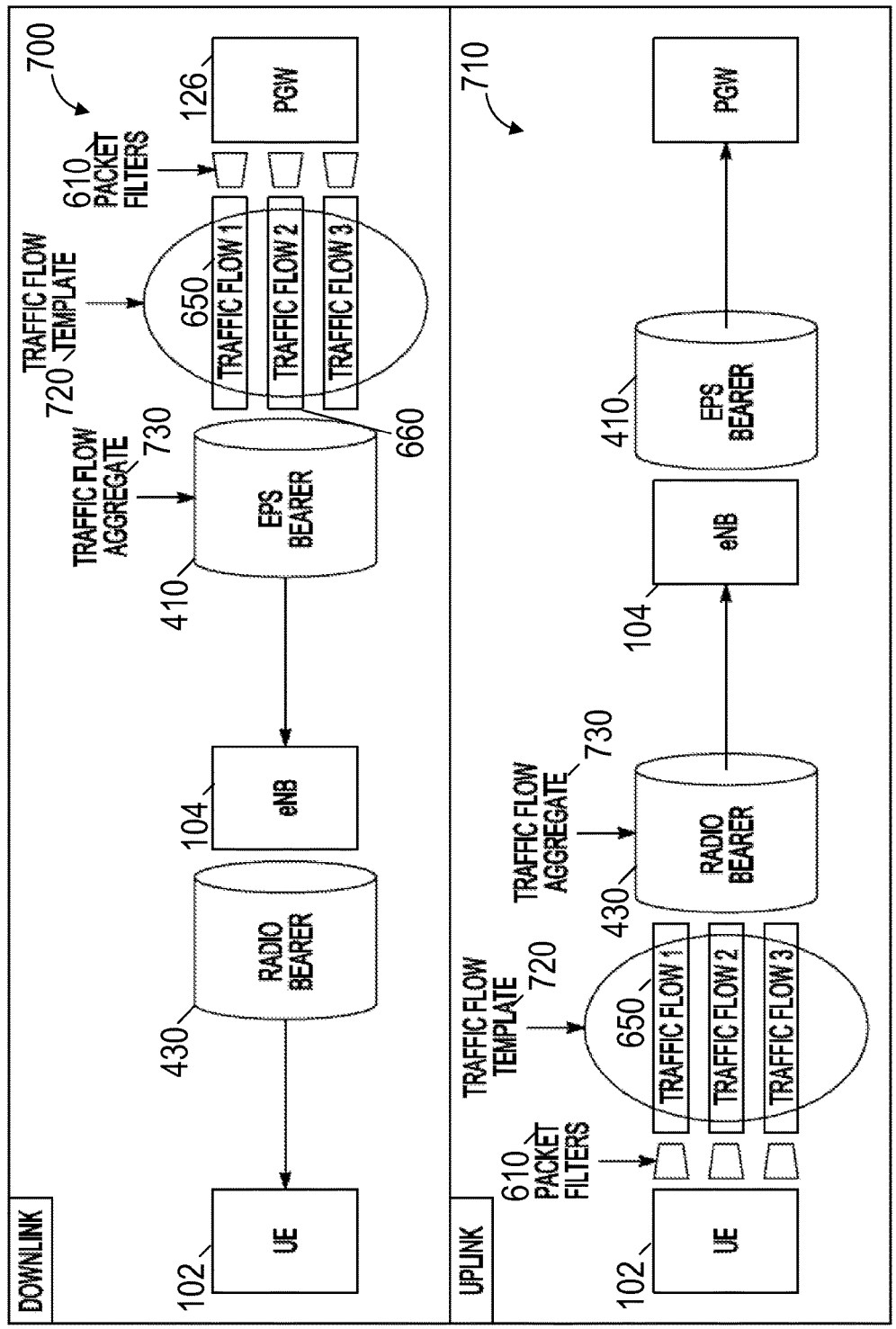
FIG. 7 illustrates an operation of a method for determining traffic flow using a packet filter, in accordance with some embodiments.

FIG. 7 illustrates an operation of a method for determining traffic flow using a packet filter, in accordance with some embodiments. The packet filter can be the packet filter 610 as illustrated in FIG. 6. Additionally, the first traffic flow 650 and the second traffic flow 660 from FIG. 6 can be part of the traffic flow template (TFT) 720 in FIG. 7.

In current LTE implementations, in an uplink transmission operation 710 the UE 102 can use the packet filter 610 to filter packets based on packet characteristic (e.g., an IP addresses or port number). Alternatively, in a downlink transmission operation 700, the PDN GW 126 can use the packet filter 610 to filter packets based on a packet characteristic. Therefore, the packet filter 610 can be applied in the UE 102 in the uplink and in the PDN GW 126 in the downlink.

Additionally, the packet filter 610 can allow for multiple services to be mapped into the same EPS bearer 410. Furthermore, in the downlink transmission operation 700, the EPS bearer 410 can be the traffic flow aggregate 730. Alternatively, in the uplink transmission operation 710, the data radio bearer 430 can be the traffic flow aggregate 730.

In current implementations, the packet filter 610 can filter packets based on the following filter components (e.g., packet characteristics). The filter components include:

0 0 0 1 0 0 0 0 for an IPv4 remote address type;
0 0 0 1 0 0 0 1 for an IPv4 local address type;
0 0 1 0 0 0 0 0 for an IPv6 remote address type;
0 0 1 0 0 0 0 1 for an IPv6 remote address/prefix length type;
0 0 1 0 0 0 1 1 for an IPv6 local address/prefix length type;
0 0 1 1 0 0 0 0 for a Protocol identifier/Next header type;
0 1 0 0 0 0 0 0 for a Single local port type;
0 1 0 0 0 0 0 1 for a Local port range type;
0 1 0 1 0 0 0 0 for a Single remote port type;
0 1 0 1 0 0 0 1 for a Remote port range type;
0 1 1 0 0 0 0 0 for a Security parameter index type;
0 1 1 1 0 0 0 0 for a Type of service/Traffic class type; and
1 0 0 0 0 0 0 0 for a Flow label type.

Figure 8:
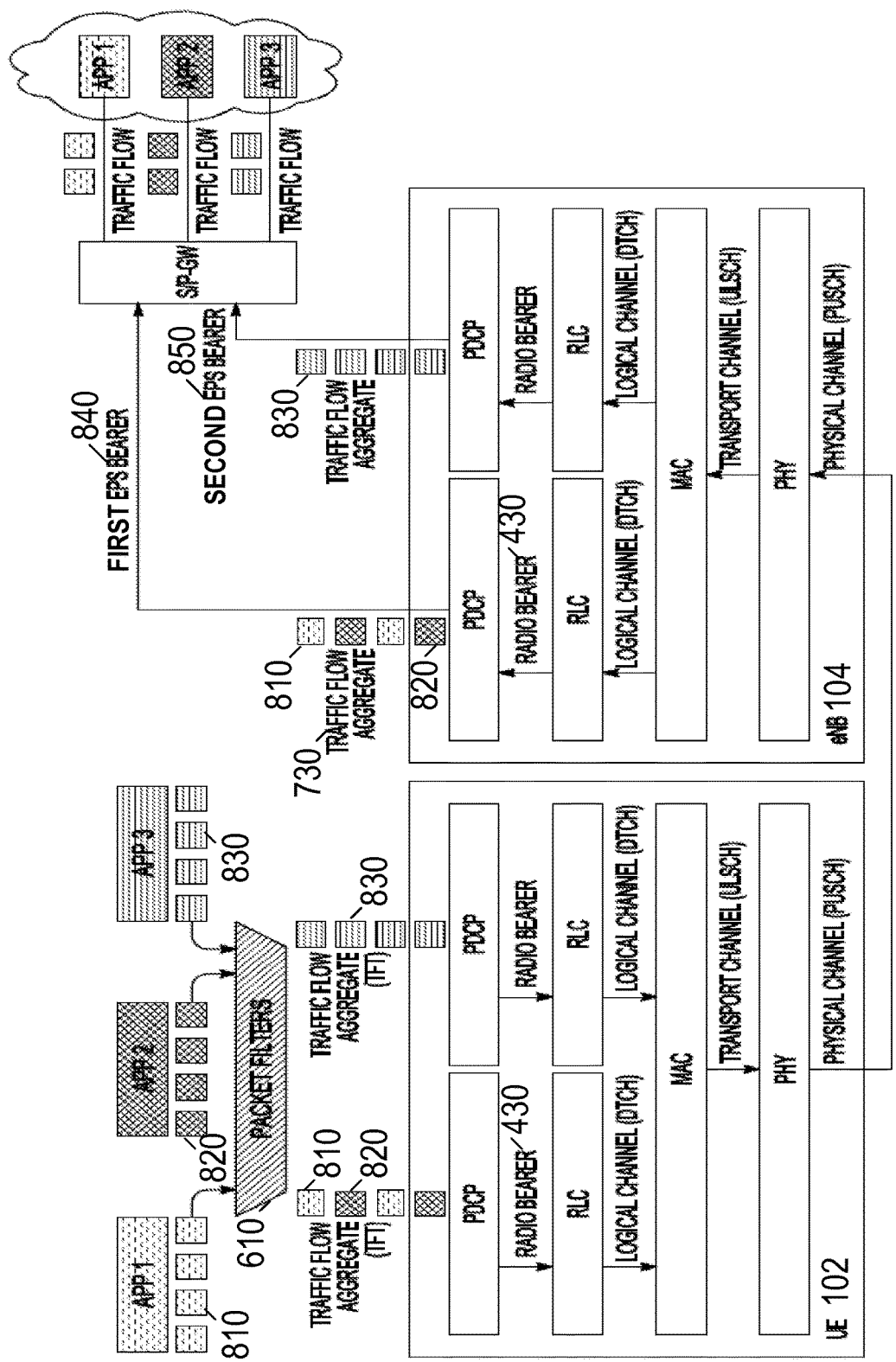
FIG. 8 illustrates an example of a protocol stack and a packet filter functionality in an uplink transmission, in accordance with some embodiments.

FIG. 8 illustrates an example of a protocol stack and a packet filter functionality in an uplink transmission, in accordance with some embodiments. The packet filter can be the packet filter 610 as illustrated in FIG. 6.

In the uplink transmission example, the UE 102 can use the packet filter 610 to determine a specific radio bearer to route a specific packet. As described in FIG. 7, each traffic flow (e.g., first traffic flow 650, second traffic flow 660) can be mapped to a radio bearer (e.g., data radio bearer 430) using the packet filter 610. Additionally, multiple traffic flows can be mapped into the same radio bearer, forming a traffic flow aggregate 730, which is represented by a traffic flow template (TFT) 720. Each radio bearer can map into a logical channel, and all logical channels can be multiplexed into a transport channel and then a physical channel.

On the receiving side (e.g., eNB 104), each traffic flow aggregate is sent in an EPS bearer (e.g., EPS bearer 410). As described previously, the QoS is given per EPS bearer. To illustrate, in FIG. 8, the App 1 packets 810 and the App 2 packets 820 can have the same QoS requirements, and therefore use a first EPS bearer 840. Additionally, the App 3 packets 830 have a different QoS requirement than the packets from App 1 and App 2, and therefore use a second EPS bearer 850.

Enhancement of Packet Filter Content Based on Existing Information

According to some embodiments, the packet filter content can be enhanced based on existing information. The existing parameters of the packet filters were previously listed. Additionally, the packet filters can be enhanced to support different parameters associated with the type of service.

For example, a new parameter, such as the size of data, can be added as a packet characteristic. Size of data can be, for example, defined as a range in bytes, or optionally defined as small, medium or large. In one example, a small size can be associated with smaller data transmission such as for machine-type-communication (MTC) devices, and a large size can be associated with larger data transmission, such as FTP downloads. A medium size transmission can be data transmission in between the small size and the large size. The range for the data size can be predetermined or modified based on past performance Thus, based on the size of the data, the packet filter 610 can route the data into different traffic data flow.

Several example embodiments of a packet filter content are presented below. It should be noted that these examples are presented for illustration of concepts described herein, but embodiments are not limited to the order in which parameters or information are presented or to any other presentation aspects, such as syntax or naming conventions. For instance, in some embodiments, a syntax or programming language associated with a standard, such as 3GPP or another standard, may be used. Some embodiments may include some or all parameters or information presented in one or more of these examples, and may include additional parameters or information not shown or described. In addition, while the examples show a packet filter content used in 3GPP standards, the content are not limited as such, and may be other standards, or in a packet header independently of such standards, in some embodiments.

In some instances, the example of packet filter content can be modified as shown below:

0 0 0 1 0 0 0 0 for an IPv4 remote address type;
0 0 0 1 0 0 0 1 for an IPv4 local address type;
0 0 1 0 0 0 0 0 for an IPv6 remote address type;
0 0 1 0 0 0 0 1 for an IPv6 remote address/prefix length type;
0 0 1 0 0 0 1 1 for an IPv6 local address/prefix length type;
0 0 1 1 0 0 0 0 for a Protocol identifier/Next header type;
0 1 0 0 0 0 0 0 for a Single local port type;
0 1 0 0 0 0 0 1 for a Local port range type;
0 1 0 1 0 0 0 0 for a Single remote port type;
0 1 0 1 0 0 0 1 for a Remote port range type;
0 1 1 0 0 0 0 0 for a Security parameter index type;
0 1 1 1 0 0 0 0 for a Type of service/Traffic class type;
1 0 0 0 0 0 0 0 for a Flow label type; and
1 0 0 0 0 0 0 1 for a Size of data, where all other values are reserved.

In some instances, the byte corresponding to the size of data can be another available combination of '1's and '0's.

Enhancement of Packet Filter Content Based on Application-Provided Information

According to some embodiments, the packet filter content can be enhanced based on application-provided information. For example, an application running on the UE 102 can provide specific information to the UE 102 or network (e.g., eNB 104) in order to help with data scheduling.

Figure 9:
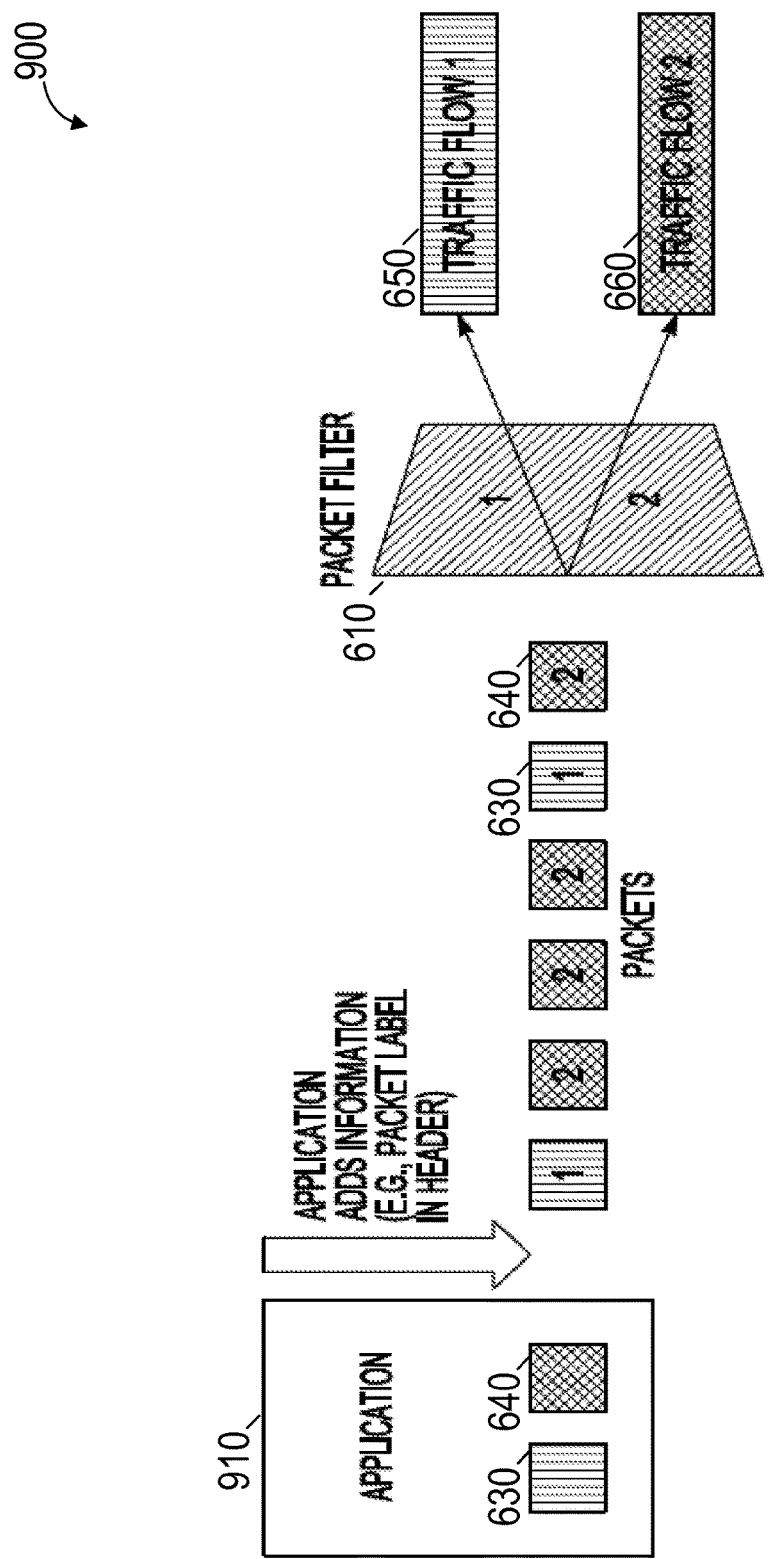
FIG. 9 illustrates an example of a scenario of a packet filter determining traffic flow using application-provided information, in accordance with some embodiments.

FIG. 9 illustrates an example of a scenario 900 of a packet filter determining traffic flow using application provided information, in accordance with some embodiments. The packet filter can be the packet filter 610 as illustrated in FIG. 6. Additionally, the first traffic flow 650 and the second traffic flow 660 from FIG. 6 can be part of the TFT 720 in FIG. 7.

The application-provided information can include a packet label in the header of the packet. In FIG. 9, the application 910 can label each packet with a different number. As previously mentioned in FIG. 6, a packet having a first characteristic 630 can have a striped pattern, and a packet having a second characteristic 640 can have a diagonal crossing pattern. Accordingly, the application 910 can label a packet having a first characteristic 630 (e.g., striped pattern) with a number "1," and the application 910 can label a packet having a second characteristic 640 with a number "2." Subsequently, and similar to the example in FIG. 6, the packets are filtered and separated so that packets with label "1" are mapped (e.g., routed) to a first traffic flow 650, and packets with a label "2" are mapped to a second traffic flow 660.

In some instances, the application 910 can add information to the (Internet Protocol) IP header to be used by the packet filter. For example, the application 910 can add a "delay budget" or "discard timer" parameter to a packet. These parameters (e.g., delay budget, discard timer) can identify a group of applications or stream of packets that share certain common characteristics. For example, packets for a real-time application can be discarded after the packets have exceed a waiting time before being transmitted or before getting to the destination. Accordingly, these type of application-provided information can be used by the packet filter in the respective nodes in order to help with scheduling.

In some instances, the example of packet filter contents can be modified as shown below:

0 0 0 1 0 0 0 0 for an IPv4 remote address type;
0 0 0 1 0 0 0 1 for an IPv4 local address type;
0 0 1 0 0 0 0 0 for an IPv6 remote address type;
0 0 1 0 0 0 0 1 for an IPv6 remote address/prefix length type;
0 0 1 0 0 0 1 1 for an IPv6 local address/prefix length type;
0 0 1 1 0 0 0 0 for a Protocol identifier/Next header type;
0 1 0 0 0 0 0 0 for a Single local port type;
0 1 0 0 0 0 0 1 for a Local port range type;
0 1 0 1 0 0 0 0 for a Single remote port type;
0 1 0 1 0 0 0 1 for a Remote port range type;
0 1 1 0 0 0 0 0 for a Security parameter index type;
0 1 1 1 0 0 0 0 for a Type of service/Traffic class type;
1 0 0 0 0 0 0 1 for a Delay budget; and
1 0 0 0 0 0 1 1 for a Discard timer, where all other values are reserved.

In some instances, the byte corresponding to the delay budget or discard timer can be another available combination of '1's and '0's.

U.S. patent application Ser. No. 14/575,101, filed on Dec. 18, 2014, and titled "USER EQUIPMENT AND METHOD FOR APPLICATION SPECIFIC PACKET FILTER," describes methods for the inclusion of a priority, congestion level and application category. The methods described herein can enhance the packet filter content by having the application 910 label each packet accordingly, such as an attention indicator, priority level, congestion level, application category, and so on.

Additionally, U.S. Provisional Patent Application Ser. No. 61/953,662 filed Mar. 14, 2014, titled "METHOD AND APPARATUS TO ASSIST NETWORK TRAFFIC" describes techniques for using the attention indicator. The attention indicator can indicate if the type of traffic is attended or unattended. Furthermore, the application 910 can label each packet with other types of information to be taken into account by the packet filter.

New Packet Classification Entity

Figure 10:
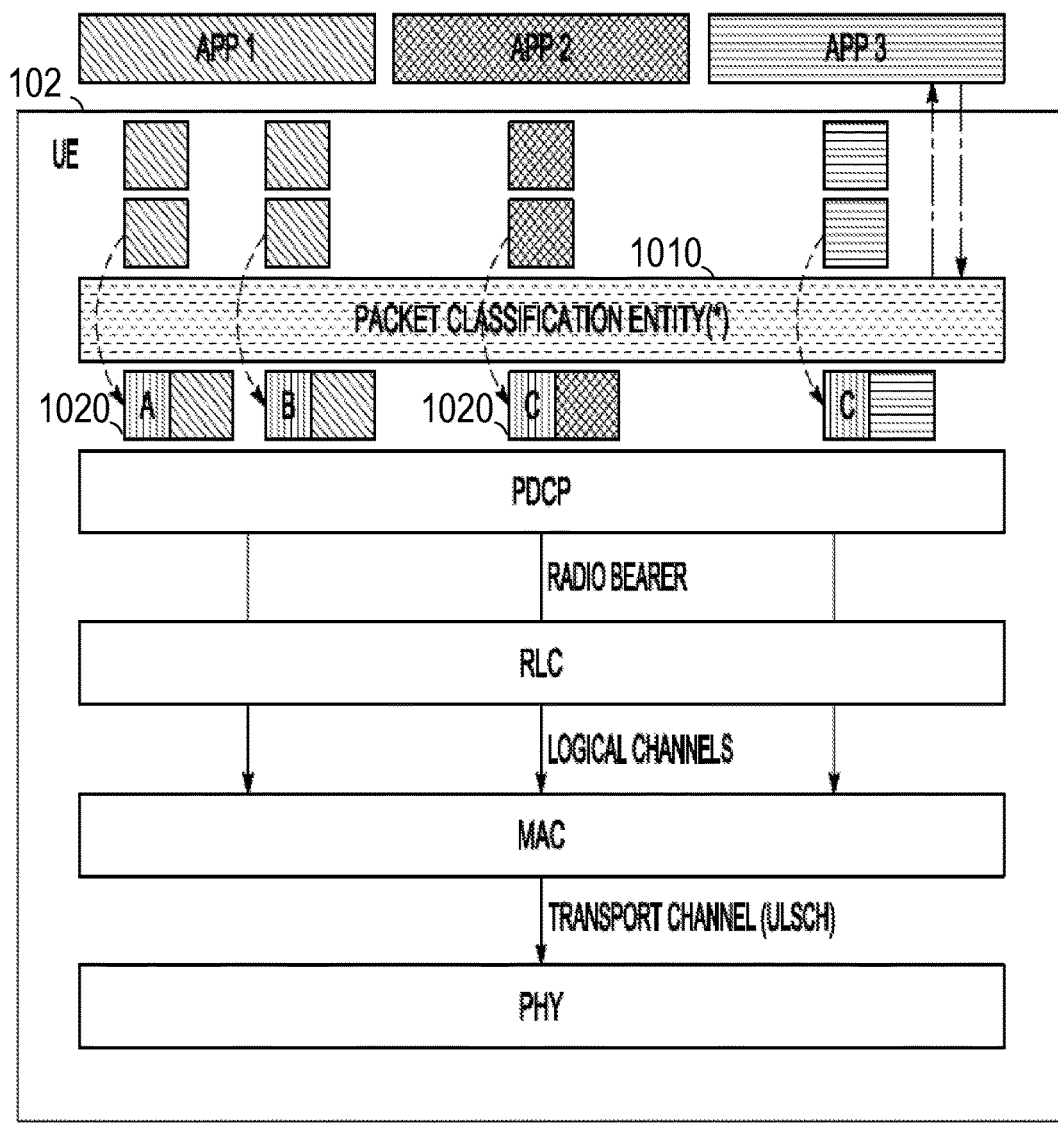
FIG. 10 illustrates an example of a packet classification entity, in accordance with some embodiments.

FIG. 10 illustrates an example of a packet classification entity, in accordance with some embodiments. According to some embodiments, a packet classification entity 1010 can be defined to handle the classification of the packets. The packet classification entity 1010 can follow pre-defined rules as defined as over the top layer (e.g., outside of the 3GPP protocol stack), or within the 3GPP protocol stack (e.g., Packet Data Convergence Protocol (PDCP) layer). Additionally, the packet classification entity 1010 can receive input information from the over the top layer to determine the packet classification information 1020. As described herein, the packet classification information can be generated inside or outside the 3GPP protocol stack based on the design of the packet classification entity 1010.

In FIG. 10, as shown from the UE 102 perspective, the packet classification entity 1010 can label each packet with a packet classification information 1020. The packet classification information 1020 can include priority information based on one or more QoS parameters. As previously mentioned, the QoS parameters include a discard timer value, a delay budget value, a latency value, a data rate, and so on. In some instances, two different packets with different QoS requirements can be received from the same application running on the UE 102. The packet classification information 1020 for each packet can be different based on the content of the packet. For example, a packet associated with a messaging service of a social network application can have a higher priority than a packet associated with a newsfeed data of the social network application.

The information to determine the packet classification information 1020 can be defined inside of the 3GPP protocol stack (e.g., PDCP layer). For example, a new header (e.g., packet classification information 1020) can be added before PDCP headers are added, by this new layer which is part of the 3GPP protocol stack.

Optionally, the packet classification information 1020 could be part of an updated PDCP header. The example in FIG. 10 shows the UE side, and thus the eNB 104 can have the same functionality or layer implemented in order to be able to decode the packet classification information 1020.

Alternatively, the packet classification information 1020 can be added as part of the IP layer in the IP header.

Packet Reclassification Entity

Figure 11:
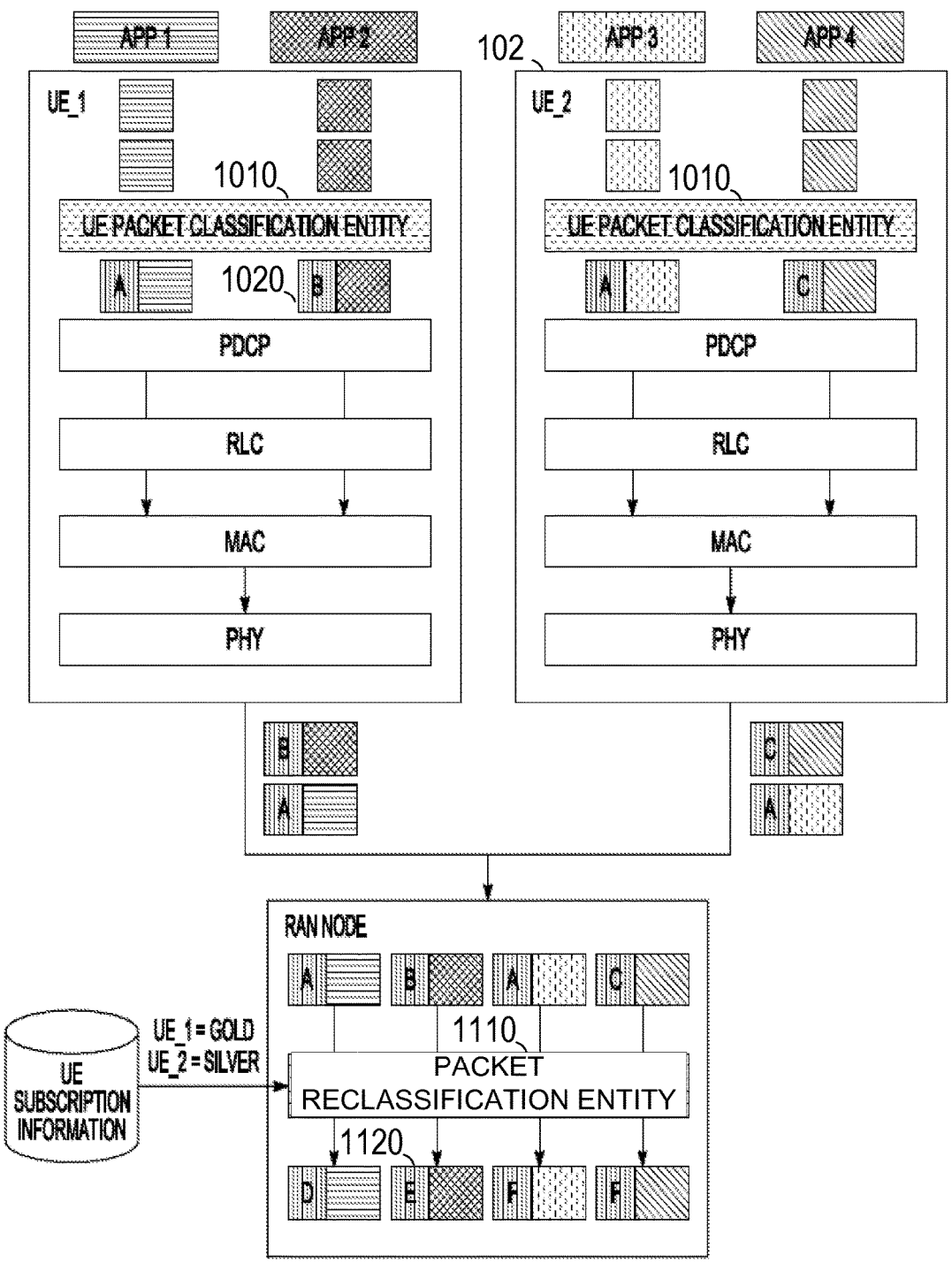
FIG. 11 illustrates an example of a packet reclassification entity, in accordance with some embodiments.

FIG. 11 illustrates an example of a packet reclassification entity, in accordance with some embodiments. In some instances, the RAN 100 can include a packet reclassification entity. According to some embodiments, a packet reclassification entity 1110 can be defined to reclassify the classification of a packet by the packet classification entity 1010, as described in FIG. 10.

In some instances, once a packet is labeled by the packet classification entity 1010, the usage of such label inside the UE 102 or the 3GPP network can vary. According to some embodiments, the packet reclassification entity 1110 can re-label the packet with packet reclassification information 1120 based on updated or local information. The packet reclassification information can include priority information tailored specifically for the eNB 104 or the SGW 124.

Additionally, during reclassification, the eNB 104 or the SGW 124 can normalize the traffic flow. In some instances, the eNB 104 can determine the priority of packets associated with different UEs. For example, a packet from a UE associated with a premium customer may have a higher priority than a packet from a UE associated with a non-premium (e.g., non-paying) customer. In another example, the packets received from different customers may be prioritized based on the allocated uplink and downlink speeds for each customer.

Furthermore, the re-labeling of the packet based on the updated information or local information can be pre-defined by sets of rules. Different approaches are described below on the packet marking and handling across different nodes (e.g., UE 102, RAN 100, core network 120).

In some instances, the packet marking is used in a single link. For certain packet directions, the packet marking rules are applied only in one link (e.g., the radio link between the UE and the RAN node). Accordingly, when the packet marking is used in a single link, the packet reclassification entity 1110 can perform the following operations. In some instances, a given node (e.g., packet classification entity 1010 in the UE 102) can label the packets and the packet label is treated in a single node in the network. The node that treats the label can be the same node that labels the packet or a different node.

For example, in the uplink transmission operation 710, the packet classification entity 1010 in the UE 102 can label the packet with a packet classification information 1020, and the marking rules are applied in the UE protocol stack. Subsequently, the RAN 100 using the packet reclassification entity 1110 can re-label each packet using a packet reclassification information 1120 based on the updated information or local information. The reclassification can help the UE 102 via appropriate scheduling or validity checking using the packet reclassification information 1120.

Alternatively, in the downlink operation transmission 700, the core network 120 can re-label the packet with a packet reclassification information 1120, and the RAN 100 can use the packet reclassification information 1120 in the radio link towards the UE 102.

In some instances, the packet marking is used in multiple links. For example, each node can apply the prioritization or scheduling based on the different needs and requirements (e.g., RAN 100 and core network 120 connections can have different support capabilities).

Additionally, two options can be considered depending on the packet classification information 1020 by the different nodes (e.g., UE 102, RAN 100, core network 120). First, the same packet classification information 1020 can be used as the packet reclassification information 1120 across all nodes. Second, the packet classification information 1020 can be re-label (e.g., reclassify) with a different packet reclassification information 1120 across the different nodes through static or dynamic labeling mapping. For example, if packets are labeled by the higher layer (e.g., using a packet classification information 1020), the network can take into account the user subscription when deciding on a packet priority for the packet reclassification information 1120. Therefore, network nodes can re-label the packets based on some other specific information about the user (e.g., premium subscriber) or even the current network policies.

Associating QoS Parameters with a Packet Filter

According to some embodiments, associating a QoS parameter with a packet can enhance the QoS handling. For example, QoS enhancement can be obtained by associating a traffic flow or packet filter to a new QoS parameter. As previously discussed, a packet filter can be associated with a priority, delay budget, or discard timer. Another example of a QoS parameter can include a latency value.

With regards to a downlink transmission process, the PDN GW 126 can perform the packet filtering procedure in order to map the packet into the appropriate filter or traffic flow. Additionally, the SGW 124 and the eNB 104 can perform the packet filtering procedure if packet filters are extended to those nodes, as described in the next section.

With regards to the uplink transmission process, the UE 102 can perform the packet filtering procedure and map the packet into the appropriate filter or traffic flow. Similarly, the mapping can be performed by the SGW 124 and the eNB 104 in the uplink if the packet filters are extended to those nodes.

Additionally, if the packet filter or traffic flow are associated with a priority, the packet can be scheduled for transmission in the PDN GW 126 based on that priority.

Furthermore, a method of implementing the association between the packet filter and the QoS parameter is to associate a QoS parameter field to each packet filter identifier. Table 1 illustrates an example of adding a QoS parameter field to the Packet FilterList of the Core Network Protocols listed in the 3GPP TS 24.008.

TABLE 1

Packet Filter List when the TFT operation is to:
create new TFT; add packet filters to existing TFT;
or replace packet filters in existing TFT.

| 8 | 7 | 6 | 5 | 4 | 3 | 2 | 1 |
|---|---|---|---|---|---|---|---|
| 0 | 0 | Packet filter direction 1 | | Packet filter identifier 1 | | | |
| | Spare | | | | | | |
| | | Packet filter evaluation precedence 1 | | | | | |
| | | Length of Packet filter contents 1 | | | | | |
| | | Packet filter contents 1 | | | | | |
| | | Packet filter QoS 1 | | | | | |
| 0 | 0 | Packet filter direction 2 | | Packet filter identifier 2 | | | |
| | Spare | | | | | | |
| | | Packet filter evaluation precedence 2 | | | | | |
| | | Length of Packet filter contents 2 | | | | | |
| | | Packet filter contents 2 | | | | | |
| | | Packet filter QoS 2 | | | | | |
| | | ... | | | | | |
| 0 | 0 | Packet filter direction N | | Packet filter identifier N | | | |
| | Spare | | | | | | |
| | | Packet filter evaluation precedence N | | | | | |
| | | Length of Packet filter contents N | | | | | |
| | | Packet filter contents N | | | | | |
| | | Packet filter QoS N | | | | | |

In some instances, the QoS parameter can be added to the Traffic Flow Template (e.g., TFT 720) as shown in table 2.

TABLE 2

Traffic Flow Template information element

| 8 | 7 | 6 | 5 | 4 | 3 | 2 | 1 |
|---|---|---|---|---|---|---|---|
| | | | Traffic flow template IEI | | | | |
| | | | Length of traffic flow template IE | | | | |
| TFT operation code | | | E bit | | Number of packet filters | | |
| | | | Packet filter list | | | | |
| | | | Parameters list | | | | |
| | | | Packet filter QoS list | | | | |

Extending the Usage of Packet Filters into Other Nodes

In current LTE implementation, the packet filters are evaluated in the UE 102 and in the PDN GW 126. Additionally, in current LTE implementation, the eNB 104 may not support packet filtering (e.g., use packet filters). Furthermore, in current LTE implementation, in order to handle congestion in the RAN 100, the RAN 100 node may not have means to differentiate the traffic within an EPS bearer 410.

According to some embodiments, by adding a new packet marking to the packets, the RAN 100 can prioritize packets based on a rules set or determined by the RAN 100. Additionally, the new packet markings can allow the eNB 104 to prioritize packets based on a rules set or determined by the eNB 104. The new packet marking can include the packet classification information 1020 using the packet classification entity 1010, or the packet reclassification information 1120 using the packet reclassification entity 1110.

According to some embodiments, it can be beneficial to use the concept of packet filters in the eNB 104 in order to enhance and extend the handling of QoS in the RAN 100 side. For example, the packet filtering can be performed in both uplink and downlink. In the downlink, the packet filtering can allow the RAN 100 node to prioritize the packets sent over the air interface. In the uplink, the packet filtering can allow the RAN 100 node to prioritize packets sent over the core network, which can impact the QoS handling over the core network. Therefore, by extending the packet filter mechanism across the different LTE nodes, the techniques described herein can improve QoS handling.

Figure 12:
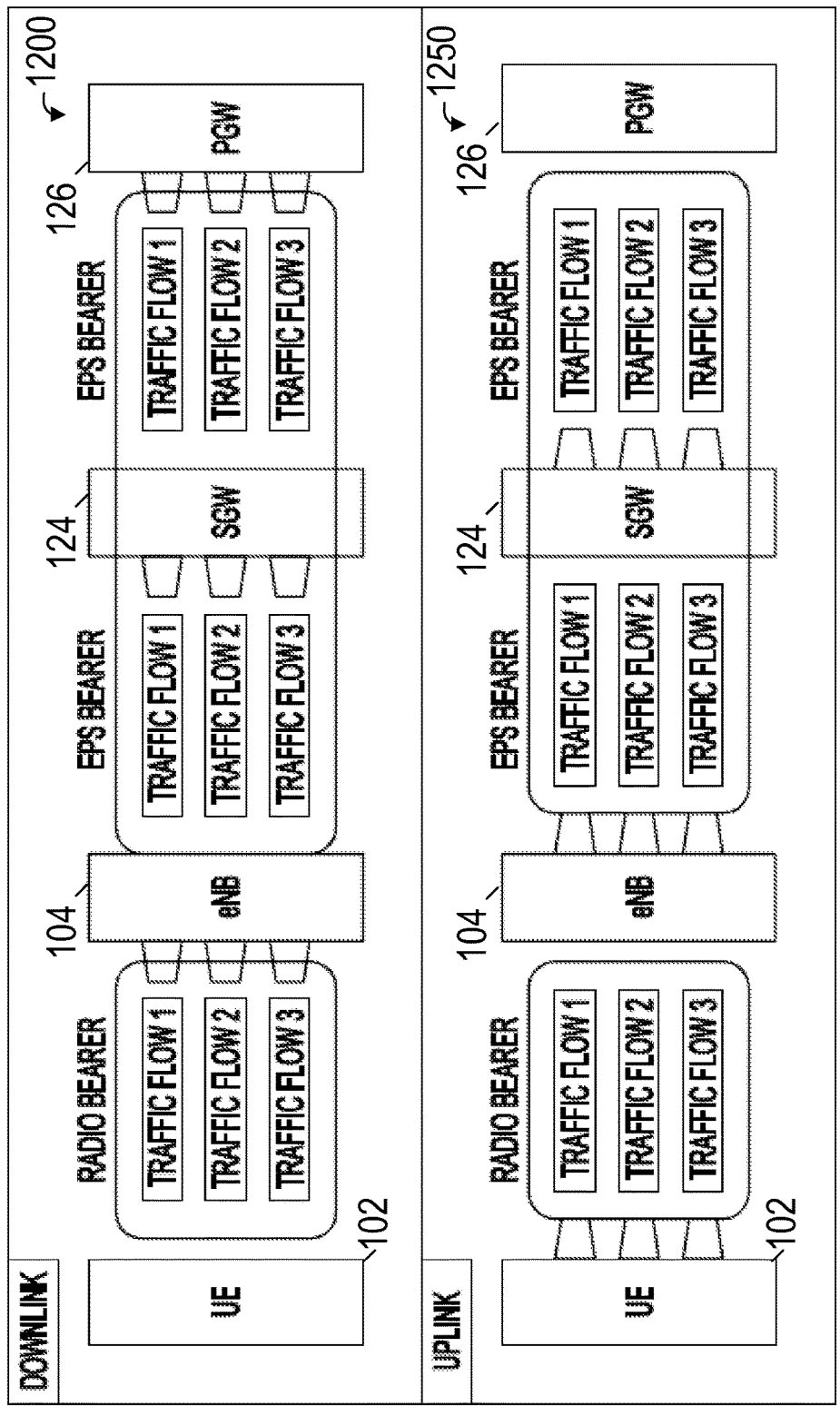
FIG. 12 illustrates a packet filter implementation in an eNB and a serving gateway, in accordance with some embodiments.

FIG. 12 illustrates an extension of packet filter implementation in both the eNB 104 and the SGW 124, in accordance with some embodiments. FIG. 12 illustrates the downlink structure 1200 and the uplink structure 1250, assuming a single EPS bearer.

U.S. Provisional Application No. 61/933,865 titled "SYSTEMS, METHODS AND DEVICES FOR APPLICATION SPECIFIC ROUTING IN DUAL CONNECTIVITY," filed Jan. 30, 2014 describes the usage of a packet filter to allow for enhancement for dual connectivity. The packet filtering mechanism can be implemented using techniques described in the referenced patent application. The techniques described herein, however, allow for many other types of enhancements on the network side besides dual connectivity, as the modification can be implemented together with the enhancements proposed above for the packet filters. Additionally, the enhancement allows for specific QoS parameters to be taken into account during packet scheduling in every node.

In some instances, as packets are routed by the PDN GW 126, the eNB 104 can use a sub-set of the packet filter in order to perform the procedures of interest such as packet scheduling. In this scenario, the complete implementation of the entire packet filter may not be needed in the eNB 104. For example, when the packet classification entity 1010 or packet reclassification entity 1110 includes the IP address and the port numbers, then the eNB 104 can perform a mapping based on the IP address or port number.

Additionally the extension of the packet filter mechanism in the eNB 104 can be beneficial when there is a problem in the link between the eNB 104 and the SGW 124, by allowing for the eNB 104 to prioritize packets based on the information provided in the packet filter (or in a subset of parameters of the packet filter).

Figure 13:
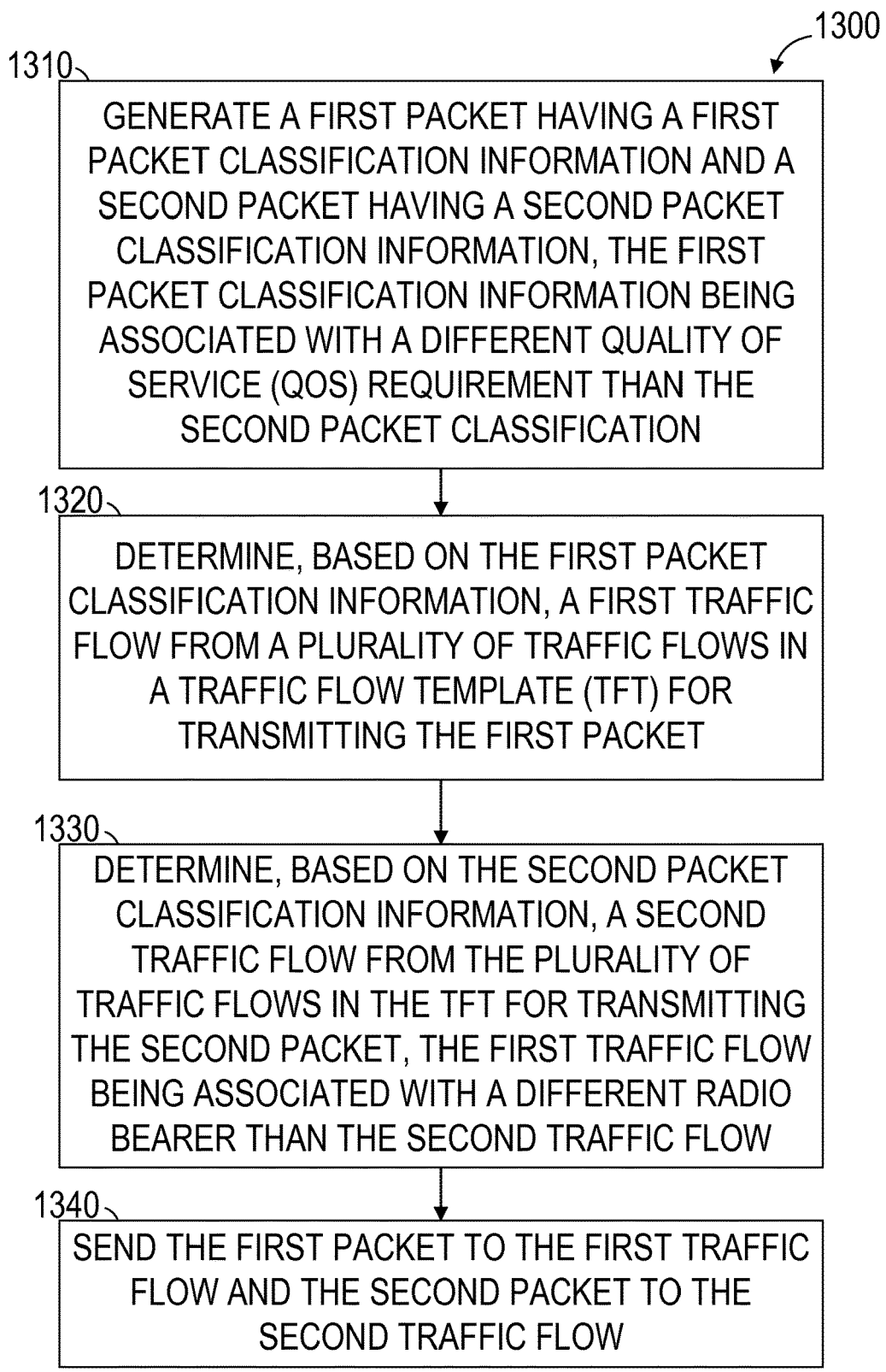
FIG. 13 illustrates the operation of a method for enhancing QoS architecture for cellular communication, in accordance with some embodiments.

FIG. 13 illustrates the operation of a method 1300 for enhancing QoS architecture for cellular communication, in accordance with some embodiments. Method 1300 can be performed by a UE (e.g., UE 102) or a PDN GW (e.g., PDN GW 126). As illustrated in FIGS. 6-10, a packet filter 610 can determine the traffic flow in a TFT based on packet classification information 1020. Embodiments are not limited to these configurations, however, and some or all of the techniques and operations described herein may be applied to any systems or networks.

It is important to note that embodiments of the method 1300 may include additional or even fewer operations or processes in comparison to what is illustrated in FIG. 13. In addition, embodiments of the method 1300 are not necessarily limited to the chronological order that is shown in FIG. 13. In describing the method 1300, reference may be made to FIGS. 1-12, although it is understood that the method 1300 may be practiced with any other suitable systems, interfaces, and components. For example, reference may be made to the scenario 900 in FIG. 9 (described earlier) for illustrative purposes, but the techniques and operations of the method 1300 are not so limited.

In addition, while the method 1300 and other methods described herein may refer to eNBs 104 or UEs 102 operating in accordance with 3GPP or other standards, embodiments of those methods are not limited to just those eNBs 104 or UEs 102 and may also be practiced by other mobile devices, such as a Wi-Fi access point (AP) or user station (STA). Moreover, the method 1300 and other methods described herein may be practiced by wireless devices configured to operate in other suitable types of wireless communication systems, including systems configured to operate according to various IEEE standards such as IEEE 802.11.

At operation 1310 of the method 1300, the UE 102, using processing circuitry, can generate a first packet having a first packet classification information (e.g., packet classification information 1020). Additionally, the UE 102 can generate a second packet having a second packet classification information. The first packet classification information can be associated with a different quality of service (QoS) requirement than the second packet classification information. In some instances, the processing circuitry can be the processing circuitry 206 of UE 200 in FIG. 2.

In some instances, the first packet classification information corresponds to a first priority value of the first packet and the second packet classification information corresponds to a second priority value of the second packet. Additionally, the first priority being different (e.g., higher, lower) than the second priority value.

In some instances, the first packet classification information and the second classification information can correspond to a priority. The priority can be dependent on a combination of QoS parameters. The QoS parameters can include, but not limited to, a discard timer value, a delay budget value, a latency value, and a data rate. Additionally, in some instances, the priority can be based on a single QoS parameter.

In some instances, the first packet classification information corresponds to a size of data of the first packet and the second packet classification information corresponds to a size of data of the second packet. Additionally, when the size of data of the first packet is smaller than the size of data of the second packet, it may result in the first packet classification information having a higher QoS requirement than the second packet classification information.

In some instances, the first packet classification information corresponds to a delay budget value of the first packet and the second packet classification information corresponds to a delay budget value of the second packet. Additionally, when the delay budget value of the first packet is smaller than the delay budget value of the second packet, it may result in the first packet classification information having a higher QoS requirement than the second packet classification information.

In some instances, the first packet classification information corresponds to a discard timer value of the first packet and the second packet classification information corresponds to a discard timer value of the second packet. Additionally, when the discard timer value of the first packet is smaller than the discard timer value of the second packet, it may result in the first packet classification information having a higher QoS requirement than the second packet classification information.

In some instances, the first packet classification information corresponds to a QoS parameter that is set by the UE for the first packet, and the second packet classification information corresponds to a QoS parameter that is set by the UE for the second packet. Additionally, when the QoS parameter for the first packet has a higher priority than the QoS parameter for the second packet, it may result in the first packet classification information having a higher QoS requirement than the second packet classification information. Moreover, the QoS parameter for the first packet can be stored in a TFT information element as illustrated in Table 2. Alternatively, the QoS parameter for the first packet can be stored in a packet filter list as illustrated in Table 1.

Continuing with method 1300, at operation 1320, the UE 102, using a packet filter, can determine, based on the first packet classification information, a first traffic flow for transmitting the first packet. The first traffic flow is determined from a plurality of traffic flows in a traffic flow template (TFT). In some instances, the packet filter can be the packet filter 610 in FIG. 6.

At operation 1330, the UE 102, using the packet filter, can determine, based on the second packet classification information, a second traffic flow for transmitting the second packet. The second traffic flow is determined from the plurality of traffic flows in the TFT. Additionally, the first traffic flow is associated with a different radio bearer (e.g., radio bearer 430, E-RAB 420, or ESP bearer 410) than the second traffic flow. In some instances, the packet filter can be the packet filter 610 in FIG. 6.

At operation 1340, the UE 102, using physical-layer circuitry (PHY), can send the first packet to the first traffic flow and the second packet to the second traffic flow. In some instances, the PHY can be the physical layer circuitry 202 of UE 200 in FIG. 2.

In some instances, the first traffic flow can map to a first radio bearer. The first radio bearer can transport the first packet of an Evolved Packet System (EPS) bearer 410 between the UE 102 and the eNB 104. Additionally, the second traffic flow can map to a second radio bearer. Given that the first traffic flow has a higher QoS than the second traffic flow, the first radio bearer can have a higher QoS than the second bearer.

In some instances, the first traffic flow can map to a first Enhanced Radio Access Bearer (E-RAB). The first E-RAB 420 can transport the first packet of an Evolved Packet System (EPS) bearer 410 between the UE 102 and the SGW 124. Additionally, the second traffic flow can map to a second E-RAB. Given that the first traffic flow has a higher QoS than the second traffic flow, the first radio bearer can have a higher QoS than the second bearer.

In some instances, the first traffic flow maps to a first Evolved Packet System (EPS) bearer. The first EPS bearer 410 can transport the first packet between the UE 102 and the PDN GW 126. Additionally, the second traffic flow can map to a second EPS bearer. Given that the first traffic flow has a higher QoS than the second traffic flow, then the first radio bearer can have a higher QoS than the second bearer.

According to some embodiments, the method 1300 as described above can be performed by the UE 102 during an uplink transmission. Additionally, according to another embodiment, the method 1300 can be performed by the PDN GW 126 during a downlink transmission. As previously described in the downlink transmission operation 700 of FIG. 7, the PDN GW 126 can use the packet filter 610 to determine the traffic flow 650 from the TFT 720.

For example, at operation 1310, the PDN GW 126, using processing circuitry, can generate a first packet having a first packet classification information. Additionally, the PDN GW 126 can generate a second packet having a second packet classification information. The first packet classification information can be associated with a different quality of service (QoS) requirement than the second packet classification information. At operation 1320, the PDN GW 126, using a packet filter, can determine, based on the first packet classification information, a first traffic flow for transmitting the first packet. The first traffic flow is determined from a plurality of traffic flows in a traffic flow template (TFT). At operation 1330, the PDN GW 126, using the packet filter, can determine, based on the second packet classification information, a second traffic flow for transmitting the second packet. The second traffic flow is determined from the plurality of traffic flows in the TFT. Additionally, the first traffic flow is associated with a different radio bearer than the second traffic flow. At operation 1340, the PDN GW 126, using physical-layer circuitry (PHY), can send the first packet to the first traffic flow and the second packet to the second traffic flow.

Figure 14:
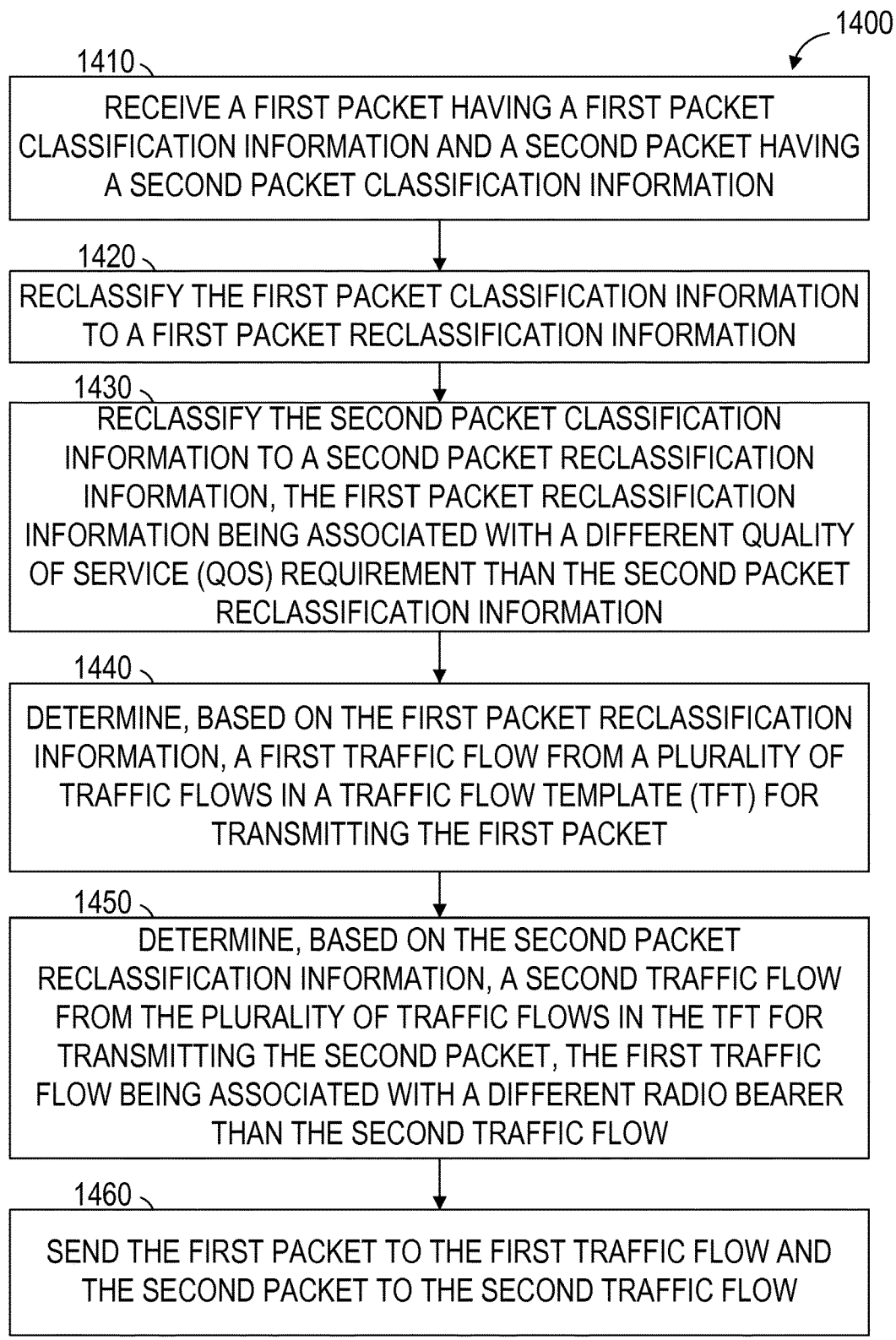
FIG. 14 illustrates the operation of a method for enhancing QoS architecture for cellular communication, in accordance with some embodiments.

FIG. 14 illustrates the operation of a method 1400 for enhancing QoS architecture for cellular communication, in accordance with some embodiments. Method 1400 can be performed by an eNB (e.g., eNB 104) or a SGW (e.g., SGW 124). It is important to note that embodiments of the method 1400 may include additional or even fewer operations or processes in comparison to what is illustrated in FIG. 14. In addition, embodiments of the method 1400 are not necessarily limited to the chronological order that is shown in FIG. 14. In describing the method 1400, reference may be made to FIGS. 1-13, although it is understood that the method 1400 may be practiced with any other suitable systems, interfaces, and components.

In addition, while the method 1400 and other methods described herein may refer to eNBs 104 or UEs 102 operating in accordance with 3GPP or other standards, embodiments of those methods are not limited to just those eNBs 104 or UEs 102 and may also be practiced by other mobile devices, such as a Wi-Fi access point (AP) or user station (STA). Moreover, the method 1400 and other methods described herein may be practiced by wireless devices configured to operate in other suitable types of wireless communication systems, including systems configured to operate according to various IEEE standards such as IEEE 802.11.

The method 1400 can be performed by an eNB 104 for a handover decision in a cellular network comprising macro cells and micro cells.

At operation 1410, the eNB 104 can include processing circuitry to receive a first packet having a first packet classification information and a second packet having a second packet classification information. The first and second packet classification information can be determined using the packet classification entity 1010 in FIGS. 10-11. For example, the packet classification information 1020 is an example of the first packet classification information. The processing circuitry 306 in FIG. 3 is an example of the processing circuitry used for performing operations 1410, 1420, and 1430.

In some instances, during an uplink transmission, the first packet and the second packet are received from the UE 102.

Alternatively, during a downlink transmission, the first packet and the second packet are received from the SGW 124. Additionally, during the downlink, the first packet and second packet can be sent to the same UE or to different UEs.

At operation 1420, the eNB 104 can reclassify the first packet classification information to a first packet reclassification information (e.g., packet reclassification information 1120 in FIG. 11). FIG. 11 illustrates an example of the reclassification using the packet reclassification entity 1110.

At operation 1430, the eNB 104 can reclassify the second packet classification information to a second packet reclassification information. The first packet reclassification information can be associated with a different quality of service (QoS) requirement than the second packet reclassification information.

At operation 1440, the eNB 104 can include a packet filter to determine, based on the first packet reclassification information, a first traffic flow from a plurality of traffic flows in a traffic flow template (TFT) for transmitting the first packet. The determination can be similar to operation 1320. However, in this instance, the determination is based on the reclassification of the packet by the eNB. The reclassification can be based on the eNB's parameters and requirements, which may be different than the UE's parameters and requirements. The packet filter 610 in FIG. 6 is an example of the packet filter used for performing operations 1440 and 1450.

At operation 1450, the eNB 104 can determine, based on the second packet reclassification information, a second traffic flow from the plurality of traffic flows in the TFT for transmitting the second packet. Additionally, the first traffic flow is associated with a different radio bearer than the second traffic flow, given that the first packet reclassification information is associated with a different quality of service (QoS) requirement than the second packet reclassification information.

At operation 1460, the eNB 104 can include physical-layer circuitry (PHY) to send the first packet to the first traffic flow and the second packet to the second traffic flow. The physical layer circuitry 302 in FIG. 3 is an example of the PHY used for performing operation 1460.

According to some embodiments, the method 1400 as described above can be performed by the eNB 104. Additionally, according to another embodiment, the method 1400 can be performed by the SGW 124.

With regards to the method 1400 being performed by the SGW 124, as previously illustrated in the downlink structure 1200 of FIG. 12, the SGW 124 can receive the first and second packet from the PDN GW 126 at operation 1410. Alternatively, as illustrated in the uplink structure 1250 of FIG. 12, the SGW 124 can receive the first and second packet from the eNB 104 at operation 1410.

What is claimed is:

1. An apparatus of a User Equipment (UE), the apparatus comprising:
    processing circuitry configured by at least one application running on the UE to generate a first packet having first packet classification information added by the at least one application and a second packet having second packet classification information added by the at least one application, the first packet classification information being associated with a different quality of service (QoS) requirement than the second packet classification information; and
    a packet filter to:
    determine, based on the first packet classification information, a first traffic flow from a plurality of traffic flows in a traffic flow template (TFT) for transmitting the first packet; and
    determine, based on the second packet classification information, a second traffic flow from the plurality of traffic flows in the TFT for transmitting the second packet, the first traffic flow being associated with a different radio bearer than the second traffic flow.

2. The apparatus of claim 1, wherein the at least one application includes a first application and first packet classification information and the second packet classification information are added to the first and second packets respectively by the first application.

3. The apparatus of claim 1, wherein the at least one application includes first and second applications and the first packet classification information is added by the first application, and the second packet classification information is added by the second application.

4. The application of claim 1, further comprising:
a UE protocol stack to receive first and second QoS parameters for the respective first and second packets from the at least one application running on the UE; and
the processing circuitry is configured to add the respective first and second QOS parameters to the first and second packets as further packet classification information based on the received first and second QoS parameters.

5. The apparatus of claim 1, wherein the at least one application configures the processing circuitry to add the first and second packet classification information to respective headers of the first packet and the second packet.

6. The apparatus of claim 1, wherein the at least one application configures the processing circuitry to add the first and second packet classification information as respective flags to the first packet and the second packet.

7. The apparatus of claim 1, wherein the first packet classification information corresponds to a first size of data of the first packet and the second packet classification information corresponds to a second size of data of the second packet, the first size of data being different than the second size of data.

8. The apparatus of claim 1, wherein the first packet classification information corresponds to a first delay budget value of the first packet and the second packet classification information corresponds to a second delay budget value of the second packet, the first delay budget value being different than the second delay budget value.

9. The apparatus of claim 1, wherein the first packet classification information corresponds to a first discard timer value of the first packet and the second packet classification information corresponds to a second discard timer value of the second packet, the first discard timer value being different than the second discard timer value.

10. The apparatus of claim 1, wherein the first packet classification information corresponds to a first priority value of the first packet and the second packet classification information corresponds to a second priority value of the second packet, the first priority being different than the second priority value.

11. The apparatus of claim 1, wherein each of the first and second packet classification information corresponds to a priority based on a combination of QoS parameters, the QoS parameters including a discard timer value, a delay budget value, a latency value, and a data rate determined by the at least one application.

12. The apparatus of claim 11, wherein the QoS parameters for the first and second packets are stored in a TFT information element.

13. The apparatus of claim 11, wherein the QoS parameters for the first and second packets are stored in respective packet filters of a packet filter list.

14. The apparatus of claim 1, wherein the first traffic flow maps to a first radio bearer, the first radio bearer transports the first packet of an Evolved Packet System (EPS) bearer between the UE and an Evolved Node B (eNB), and wherein the second traffic flow maps to a second radio bearer, the first radio bearer having a different QoS than the second radio bearer.

15. The apparatus of claim 1, wherein the first traffic flow maps to a first Enhanced Radio Access Bearer (E-RAB), the first E-RAB transports the first packet of an Evolved Packet System (EPS) bearer between the UE and a serving gateway (SGW), and wherein the second traffic flow maps to a second E-RAB, the first E-RAB having a different QoS than the second E-RAB.

16. The apparatus of claim 1, wherein the first traffic flow maps to a first Evolved Packet System (EPS) bearer, the first EPS bearer transports the first packet between the UE and a packet data network gateway (PDN GW), and wherein the second traffic flow maps to a second EPS bearer, the first EPS bearer having a different QoS than the second EPS bearer.

17. A non-transitory computer-readable storage medium that stores instructions for execution by one or more processors to perform operations for transmitting a first packet and a second packet, the operations to configure a User Equipment (UE) to:
generate a first packet having first packet classification information added by at least one application configured to run on the UE and a second packet having second packet classification information added by the at least one application, the first packet classification information being associated with a different quality of service (QoS) requirement than the second packet classification information;
determine, based on the first packet classification information associated with the first packet, a first traffic flow from a plurality of traffic flows in a traffic flow template (TFT) for the transmitting of the first packet;
determine, based on the second packet classification information associated with the second packet, a second traffic flow from the plurality of traffic flows in the TFT for the transmitting of the second packet; and
send the first packet to the first traffic flow and the second packet to the second traffic flow, the first traffic flow being associated with a different radio bearer than the second traffic flow.

18. The non-transitory computer-readable storage medium of claim 17, wherein the first packet classification information corresponds to a delay budget value of the first packet and the second packet classification information corresponds to a delay budget value of the second packet, and wherein the delay budget value of the first packet is different than the delay budget value of the second packet.

19. An Evolved Node B (eNB) configured to communicate in a cellular network, the eNB comprising:
processing circuitry to:
receive a first packet having a first classification and a second packet having a second classification;
reclassify the first classification to a first packet reclassification and the second classification to a second packet reclassification, the first packet reclassification being associated with a different priority requirement than the second packet reclassification; and
a packet filter to:
determine, based on the first packet reclassification, a first traffic flow from a plurality of traffic flows for transmitting the first packet;
determine, based on the second packet reclassification, a second traffic flow from the plurality of traffic flows for transmitting the second packet, the first traffic flow being associated with a different radio bearer than the second traffic flow, and
wherein the first packet is received from a first User Equipment (UE) and the second packet is received from a second UE.

* * * * *